United States Patent [19]

Moolenaar

[11] Patent Number: 5,604,605
[45] Date of Patent: Feb. 18, 1997

[54] METHOD AND DEVICE FOR INTRALINEARLY HALFTONING DIGITIZED GREY VALUE IMAGES

[75] Inventor: Abraham Moolenaar, Venlo, Netherlands

[73] Assignee: Oce-Nederland B.V., Netherlands

[21] Appl. No.: 227,284

[22] Filed: Apr. 13, 1994

[30] Foreign Application Priority Data

Apr. 22, 1993 [NL] Netherlands ............................ 9300684

[51] Int. Cl.$^6$ .................................................. H04N 1/407
[52] U.S. Cl. ............................ 358/456; 358/466; 382/251
[58] Field of Search ............................ 382/50, 236, 237, 382/251, 252; 358/298, 456–459, 447, 448, 465–466; H04N 1/407

[56] References Cited

U.S. PATENT DOCUMENTS

| | | | |
|---|---|---|---|
| 5,008,950 | 4/1991 | Katayama et al. . | |
| 5,271,070 | 12/1993 | Truong et al. | 382/54 |
| 5,307,425 | 4/1994 | Otsuka | 382/50 |
| 5,317,653 | 5/1994 | Eschbach et al. | 382/50 |
| 5,363,210 | 11/1994 | Sasaki et al. | 358/462 |

FOREIGN PATENT DOCUMENTS 0201674  11/1986  European Pat. Off. .

OTHER PUBLICATIONS

"Using Peano Curves for Bilevel Display of Continuous-Tone Images" (IEEE Computer Graphics & Applications; (May, 1982), pp. 47–52).

"Halftoning Techniques Using Error Correction" (Proceedings of the SID, 27, (1986), pp. 305–308).

Primary Examiner—Kim Vu

[57] ABSTRACT

A method and device for parallel intralinear halftoning of digitized grey value images divided into lines pixels, including (1) successive thresholding of grey values of the pixels and (2) transportation of a quantization error for each pixel to at least one neighboring pixel still to be thresholded by adjusting the grey value of the at least one neighboring pixel with at least a portion of the quantization error. The halftoning includes: dividing each of the lines of pixels into at least two disparate groups of pixels; separately thresholding each group of pixels within each line; and transporting the quantization error from a pixel of one group to at least one pixel of at least one other disparate group.

45 Claims, 10 Drawing Sheets

FIG. 1A

Prior Art

FIG. 1B

Prior Art

| 0 | 100 | 0 | 100 | 0 |
| 0 | 100 | 0 | 100 | 0 |
| 100 | 100 | 100 | 100 | 100 |
| 60 | 20 | 60 | 20 | 60 |
| 60 | 60 | 60 | 60 | 60 |

FIG. 5H

| 0 | 100 | 0 | 100 | 0 |
| 0 | 100 | 0 | 100 | 0 |
| 100 | 100 | 100 | 100 | 100 |
| 60 | 0 | 80 | 0 | 80 |
| 60 | 60 | 60 | 60 | 60 |

FIG. 5I

| 0 | 100 | 0 | 100 | 0 |
| 0 | 100 | 0 | 100 | 0 |
| 100 | 100 | 100 | 100 | 100 |
| 100 | 0 | 100 | 0 | 100 |
| 60 | 40 | 60 | 40 | 60 |

FIG. 5J

| 0 | 1 | 0 | 1 | 0 |
| 0 | 1 | 0 | 1 | 0 |
| 1 | 1 | 1 | 1 | 1 |
| 1 | 0 | 1 | 0 | 1 |
| 1 | 0 | 1 | 0 | 1 |

METHOD AND DEVICE FOR INTRALINEARLY HALFTONING DIGITIZED GREY VALUE IMAGES

BACKGROUND OF THE INVENTION

1. Field of the Invention

The present invention relates to a method and device of halftone imaging and more specifically to halftoning digitized grey value images divided into pixels.

2. Discussion of Related Art

A method of halftoning digitized grey value images is known from Ulichney, Robert: "Digital Halftoning, MIT Press, 1987, Chapter 8, under the name of error diffusion. In this, a grey value of a pixel is compared with a given threshold value. If this threshold value is exceeded a logic "one" or "zero" is generated. By means of this a binary printer, e.g. a black/white printer, can print the pixel as black or white. The error which occurs when a grey value is reduced to either black or white is known as the quantization error.

Apart from texts and lines, insofar as they do not contain grey tints, a quantization error of this kind will lead to an unacceptable result in the case of photographs and screens. However, by dividing the quantization error over and adding it to grey values of neighboring pixels which have not yet been thresholded, a grey value impression perceived by the eye to correspond to the grey value before thresholding will nevertheless be obtained despite the fact that there are only two values to print. A grey surface whose grey value is, for example, approximately equal to the threshold value will, as a result, be converted to a mixture of approximately as many black as white pixels which, over a larger area, will give the same grey value impression as that of the original grey surface.

Figure 1A:
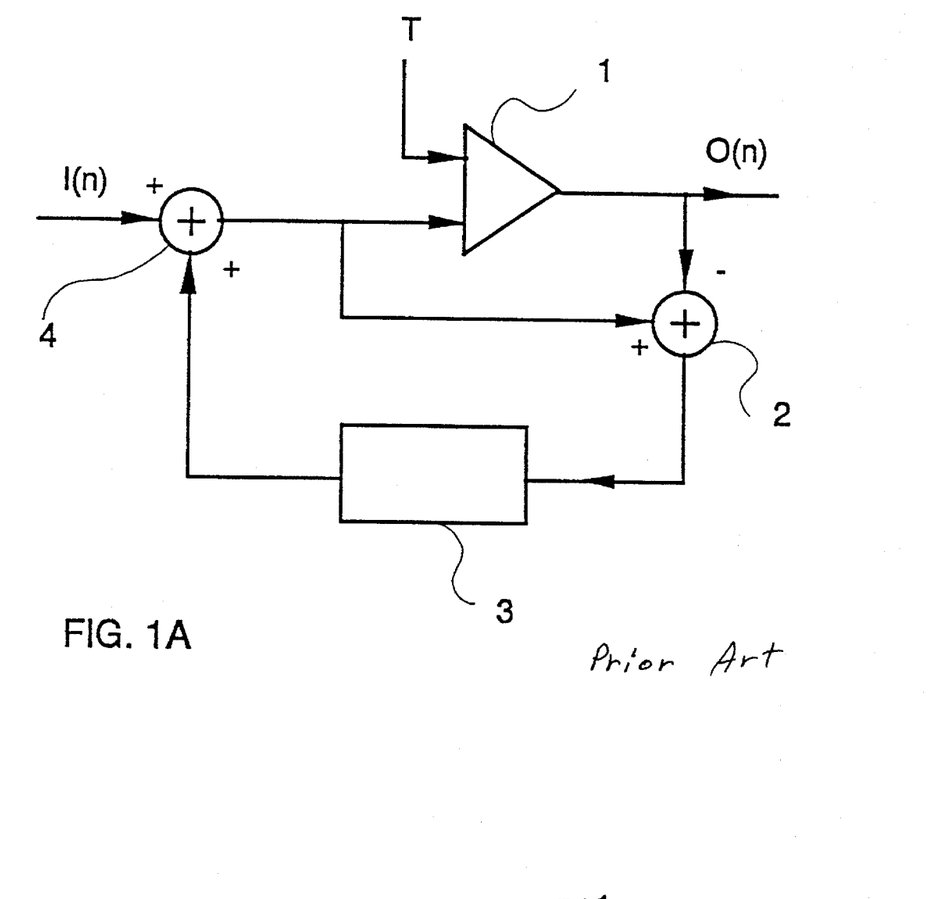
FIGS. 1A, 1B and 1C illustrate a first example of a known method of error diffusion.

FIG. 1A shows the general principle of an error diffusion method. A digitized grey value l(n) corresponding to the grey value of a pixel n of an image divided into pixels is subjected to a first threshold processing 1. In this case, the digitized grey value l(n) may consist, for example, of an 8-bit data word with which 256 possible grey values of a pixel can then be reproduced. It should be noted that the term "grey value" in this context is not intended to indicate the color grey but an intensity value. The "grey value" can thus also refer to a color of a color separation image of a color image made up of elementary colors such as cyan, magenta and yellow. The grey value l(n) may originate, for example, from a document scanner, an image memory or a communications line. Finally, the pixels will frequently be arranged in horizontal lines and vertical columns with, for example, 300 pixels per inch or 600 pixels per inch.

The threshold processing 1 usually consists of a comparison of the grey value information l(n) with a fixed threshold value T. For example, T=128 in the case of 8-bit grey value information. However, without departing from the error diffusion principle, different location-dependent threshold values can be applied. These can be obtained, for example, by means of a dither matrix.

After thresholding of the grey value l(n), the result O(n) will be "0" (black) or "1" (white, color) depending on whether the grey value l(n) is less than or greater than the threshold value T. This result is suitable for supplying to a binary printer or reproduction system, e.g. a black/white printing laser or LED printer. It should be noted that halftoning is not restricted solely to converting grey value signals to binary signals. Halftoning can also be used, for example, for converting 8-bit grey value signals to 4-bit grey value signals. A difference, hereinafter referred to as a quantization error, between the grey value l(n) and the binary value O(n), obtained by thresholding of a pixel n, is determined in a rounding-off error determining step 2 and divided, by a dividing operation 3, and added, via adding step 4, to the next grey values l(n+1),l(n+2), . . . still to be thresholded.

Depending on the pixels over which, and the weighting factors with which, the quantization error is transported, a specific error diffusion method is obtained. In the above-mentioned work by Ulichney, various methods are described for dividing and adding or transporting the quantization error. For example, according to Floyd and Steinberg, transport to 4 neighboring pixels is applied, or, according to Jarvis, Judice and Ninke, transport to 12 neighboring pixels. In these cases, the quantization error is transported to the neighboring pixels with different weighting factors.

Figure 1B:
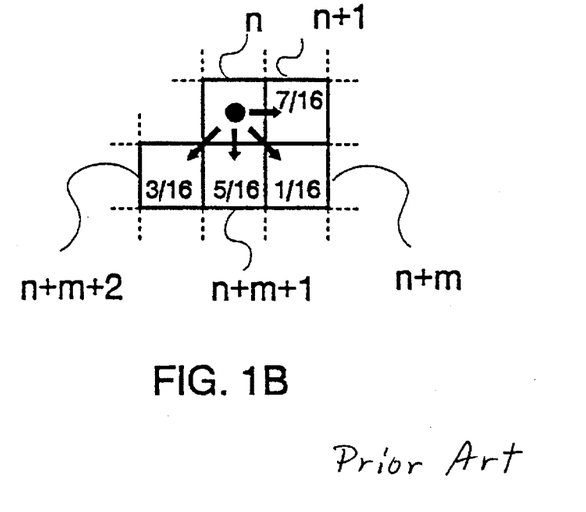

FIG. 1B gives an example of transportation of the quantization error according to Floyd and Steinberg. The quantization error of the thresholded pixel n indicated by a dot is transported, with the weighting factors indicated in the Figure, to the following pixel n+1 on the same image line and to the pixels n+m, n+m+1, n+m+2 on a following image line. The thresholding sequence is indicated by a given path formed, for example, by a line raster, the lines of which are successively traversed from left to right and from top to bottom. Various error diffusion methods are obtained inter alia by the choice of pixels to which the quantization error is transported, the weighting factors with which this is done, and the choice of path.

One disadvantage of the method according to the error diffusion principle is the visibility of regular tracks of successive pixels having the same grey value in the print. Such tracks occur as a result of the transportation of the quantization error in accordance with a fixed distribution. Accordingly, it is known to suppress these regular tracks to some extent, for example by providing a random fluctuating component for the weighting factors with which the quantization errors are divided.

Figure 1C:
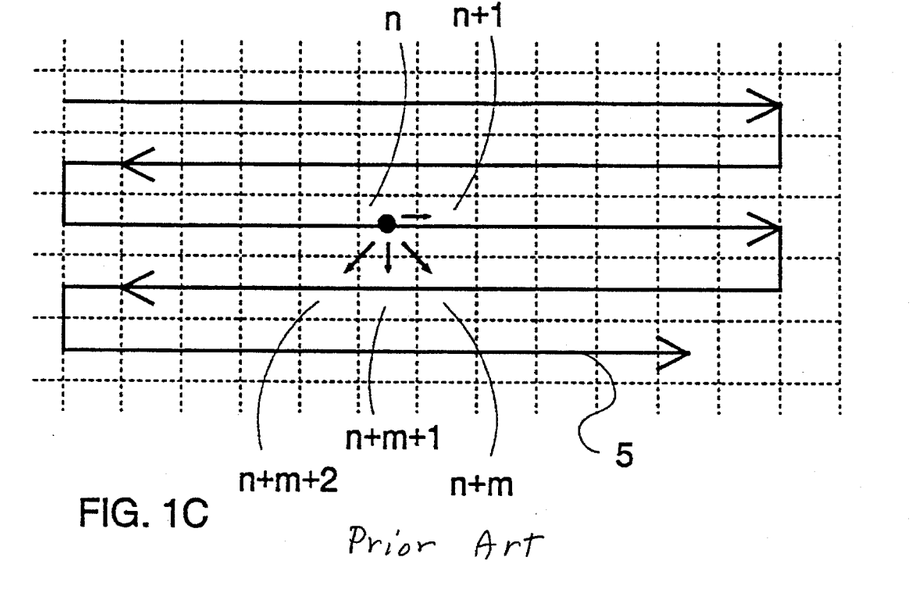

Other likewise known methods of suppressing such tracks are based on a less regular path by which the pixels are successively processed. For example the pixels may be processed in accordance with a serpentine-like path, in which the pixels are traversed alternately line-wise from left to right and vice-versa. Thus FIG. 1C, for example, illustrates a serpentine path 5, in which the pixels n, n+1 . . . are processed alternately from left to right and from right to left. The pixels are therefore thresholded consecutively one by one in the sequence n, n+1, . . . n+m, n+m+1 . . . etc. In this way the occurrence of "tracks" as a result of the transmission of errors in the same direction is suppressed to a certain extent.

Figure 2:
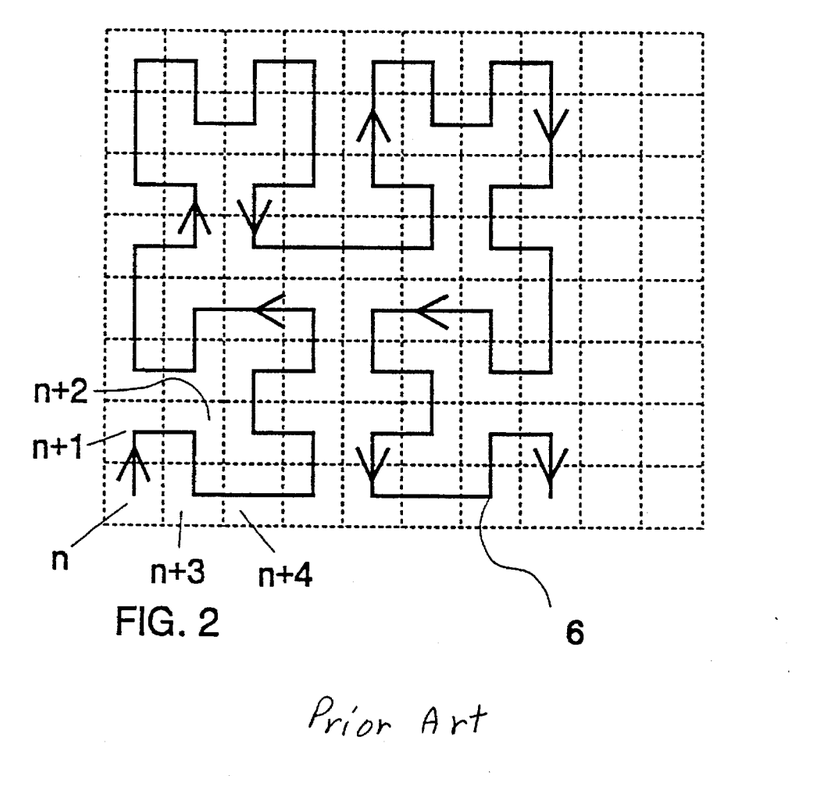
FIG. 2 shows a second example of a known method of error diffusion.

Another example is a path traversing a pseudo-random curve such as meander-shaped Hilbert or Peano-curve. FIG. 2 gives an example of such a path 6 as described by I. A. Witten and R. M. Neal in "Using Peano Curves for Bilevel Display of Continuous Tone Images" (IEEE Computer Graphics & Applications; May (1982), pages 47–52). A path of this kind also traverses all the pixels in which the pixels are thresholded consecutively one by one. A quantization error from a pixel n is in this case transported over the next pixel n+1 on the curve. As a result, the distribution of the quantization error also acquires a quasi-random character. The instant literature also describes dividing an image into different parts each traversed by a Peano-curve. In this case, however, the quantization error of a pixel is always transported to a pixel of the same curve.

A disadvantage of pseudo-random curves of this kind is that the reproduction of spatial details is reduced since the quantization error is now always distributed in changing directions, as noted by G. S. Fawcett and G. F. Schrack in "Halftoning Techniques Using Error Correction" (Proceedings of the SID, 27, (1986), pages 305–308).

Another disadvantage of halftoning methods based on error diffusion is the serial character. For example, a pixel at the end of a scanning line cannot be processed until the pixels in front of it on the scanning line have been processed so that the quantization error to be added to the pixel is available. Consequently, this method is less suitable for a simultaneous and parallel processing of pixels. Although the processing time can be reduced by dividing an image into different sub-images, each of which is subjected to an error diffusion processing operation separately by means of its own path, the boundaries between the sub-images will still remain visible. The sub-images must also have minimum dimensions for good distribution of the quantization error.

SUMMARY OF THE INVENTION

The method according to the present invention obviates the above disadvantages and comprises successive thresholding of grey values of the pixels and transportation of a quantization error made in these conditions for each pixel to at least one neighboring pixel still to be thresholded, by adding the quantization error or part thereof to a grey value of the at least one pixel. More specifically, the method is characterized in dividing the pixels into groups, group-wise thresholding of the grey values of the pixels divided into groups, and transportation of the quantization error from a pixel of a group to solely pixels of at least one other group.

Since the quantization errors originating from the pixels of a group are transported only to pixels of another group, all of the pixels within a group can be thresholded independently of one another and even simultaneously, for the quantization errors occurring during thresholding are transported to pixels of another group. Marginal effects, as mentioned above in the case of parallel processing of different sub-images, are now avoided since the transportation of a quantization error to the other group is not restricted to boundaries within a group. Parallelization per se can now be effected simply, although this is not a requirement to achieve an advantage of the method according to the invention.

The image processing device according to the present invention comprises input means for receiving grey value signals representing pixels, halftoning unit connected to the input means, for halftoning the grey value signals, output means connected to the halftoning unit, for outputting binary signals, the halftoning unit being provided with thresholding means for thresholding grey value signals to be fed thereto to produce thresholded signals, quantization error determining means for determining an error signal representative of a difference between a grey value signal to be fed to the thresholding means and corresponding to a pixel and the thresholded signal corresponding thereto and produced by the thresholding means, and error division means for transporting at least a part of the error signal to a grey value signal still to be fed to the thresholding means and corresponding to at least one neighboring pixel.

The image processing device is characterized in that the halftoning unit is suitable for dividing the pixels into groups and group-wise thresholding the grey value signals of the pixels divided into groups, the error division means being suitable for transportation of an error signal from a pixel of a group solely to grey value signals, still to be thresholded, of pixels of at least one other group.

One embodiment of the method is obtained by dividing the grey value image into rows and columns of pixels and forming, for each row or each column, a group by pixels situated in the row or column. The groups thus defined now lend themselves well to parallel reading and writing operations on an image memory oriented in columns and rows.

Another embodiment of the method is obtained by transportation of the quantization error signal from a pixel situated in a row, to the pixels, still to be thresholded, situated in an adjacent row in the same and the adjacent columns. In this case the number of pixels over which the quantization error is divided is limited, although good spread is obtained by the division in three directions.

Another embodiment of the method is obtained by dividing the grey value image into rows and columns of pixels and forming, for each row, a group by pixels situated in odd columns of the row and forming, for each row, a group by pixels situated in even columns of the row. This embodiment has the advantage that the quantization error can now also be transported in the direction of a row, for example, by transporting in the row direction a quantization error from the group formed by the even pixels, to the group formed by odd pixels in the same row. One embodiment of this is characterized by transporting the quantization error from a pixel of a row, situated in an odd column, to the pixels, still to be thresholded, of the two adjacent even columns of the same row, and transporting the quantization error from a pixel of a row, situated in an even column, to the pixels, still to be thresholded, of the two adjacent odd columns of an adjacent row.

BRIEF DESCRIPTION OF THE DRAWINGS

The invention will be explained with reference to the accompanying drawings, in which.

DETAILED DESCRIPTION OF THE PREFERRED EMBODIMENTS

Figure 3A:
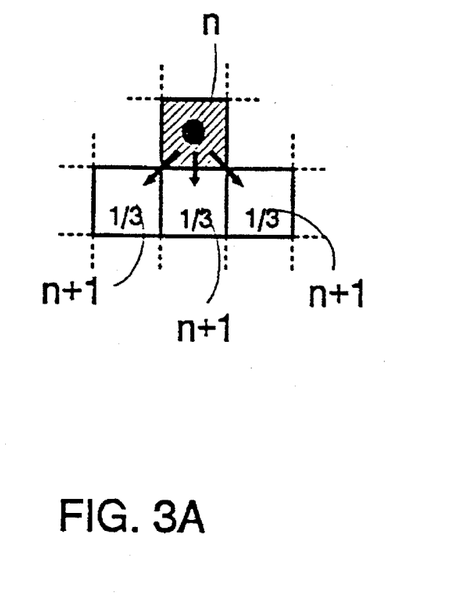
FIGS. 3A, 3B and 3C show a first embodiment of a method according to the present invention.
Figure 3B:
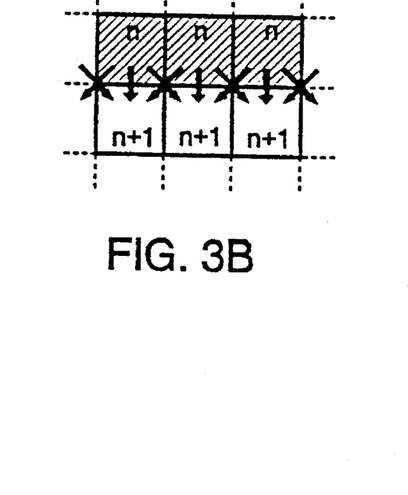

FIGS. 3A and 3B show a first embodiment of the method according to the present invention. FIG. 3A shows the condition for the transportation of the quantization error. The quantization error for a pixel in the group n in a row is divided by the weighting factors shown in FIG. 3A and added to the adjacent pixels in the group n+1 of a following row according to FIG. 3A. FIG. 3B shows the groups n and n+1 in which the pixels are distributed. These groups n and n+1 are thus formed by the horizontal rows. The pixels within a group n are simultaneously thresholded, the quantization error being transported for thresholding, in accordance with the condition shown in FIG. 3A, to the following pixels in the group n+1. The pixels of the group n+1 are then thresholded with transportation of the quantization error to the pixels of group n+2 and so on. It is essential that a quantization error should not be divided within a group so that the different pixels of the group can be thresholded independently or even simultaneously. Thus, to summarize, the quantization error is transported row by row as follows:

| 1st row | from group n | according to FIG. 3A | to group n + 1 |
|---|---|---|---|
| 2nd row | from group n + 1 | according to FIG. 3A | to group n + 2 |
| 3rd row etc. | | | |

Figure 3C:
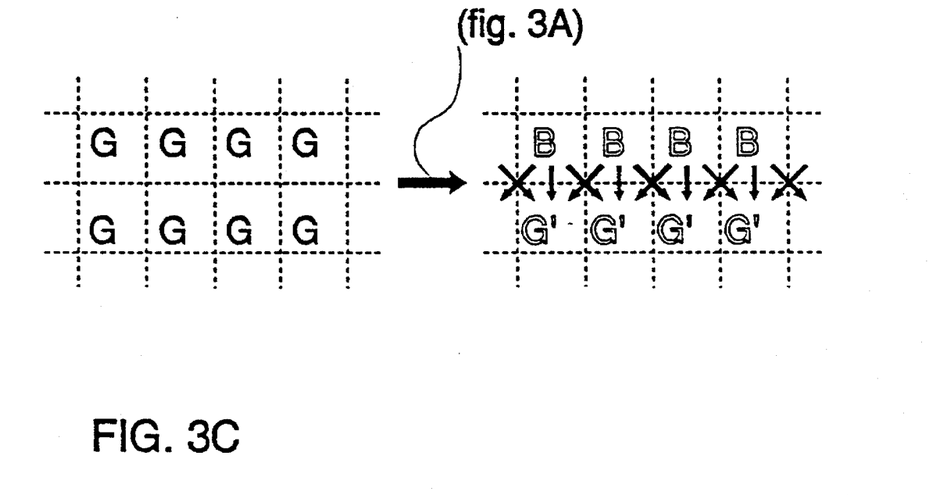

FIG. 3C shows how the grey values G are converted to binary values B by thresholding or to grey values G' by transportation of a quantization error.

Other embodiments of the method according to the invention are obtained by different conditions for distributing the quantization error, for example, by different weighting factors with or without a random factor. Nor is it necessary for the pixels within a group first to be thresholded before starting thresholding the pixels of the next group. The pixels of the next group to which the quantization error of the instantaneous group has already been added can be thresholded meanwhile. At the same time simultaneous thresholding can be limited to some of the pixels of a group (e.g. 16 each time).

Figure 4A:
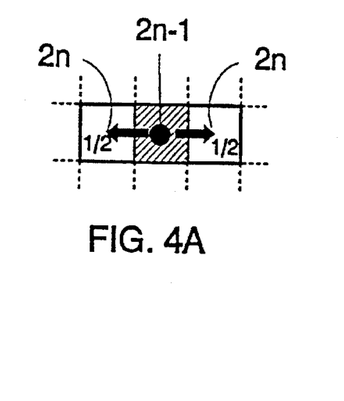
FIGS. 4A to 4D show a second embodiment of a method according to the present invention, FIGS. 5A to 5J give an example of a digitized image processed by the method according to FIGS. 4A to 4D, FIGS. 6A to 6E show a third embodiment of a method according to the present invention.
Figure 4B:
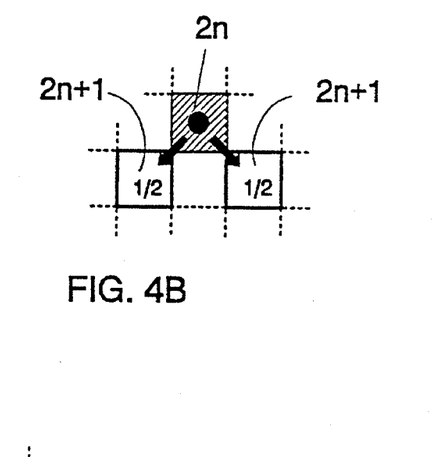
Figure 4C:
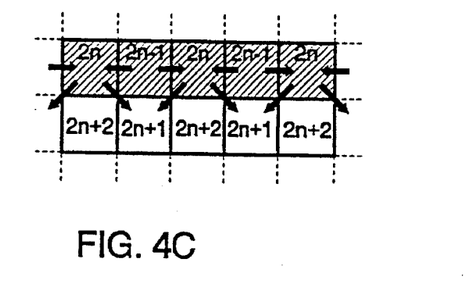

As already stated, a quantization error of a pixel is not distributed over pixels of the same group. In the case of groups formed by, for example, horizontal lines, it would not be possible then for transportation to be carried out horizontally. However, by defining a first and a second group of pixels in such a manner that the pixels of the two groups are situated, for example, on a horizontal line, this difficulty can be overcome. FIGS. 4A, 4B and 4C show a second method according to the invention which illustrates this.

FIGS. 4A and 4B respectively show a first and a second condition for the transportation of the quantization error from the pixels in group 2n to the pixels of group 2n−1 shown in FIG. 4C. The quantization errors of the pixels of the group 2n−1 (the odd-numbered pixels) are transported in accordance with the condition shown in FIG. 4A while the quantization errors of the pixels of the group 2n (the even-numbered pixels) are transported in accordance with the condition shown in FIG. 4B. This is repeated for each subsequent line, i.e. after processing of the line with the groups 2n and 2n−1, the line with the groups 2n+2 and 2n+1 is processed, and so on. The groups of pixels in this case are therefore formed by line-wise cross-sections of the even and odd numbered columns.

Quantization errors of the odd-numbered pixels forming the group 2n−1 are thus transported to the even-numbered pixels forming the group 2n in the same horizontal row. This, therefore, gives a distribution in the horizontal direction. Quantization errors of the even-numbered pixels in the group 2n are then transported to the odd-numbered pixels in the group 2n+1 of a subsequent row. In this way part of the quantization error is also transported to a following row. To summarize, the quantization error is transported as follows:

| 1st row | | |
|---|---|---|
| from group 2n − 1 | according to FIG. 4A | to group 2n |
| from group 2n | according to FIG. 4B | to group 2n + 1 |
| 2nd row | | |
| from group 2n + 1 | according to FIG. 4A | to group 2n + 2 |
| from group 2n + 2 | according to FIG. 4B | to group 2n + 3 |
| 3rd row etc. | | |

Figure 4D:
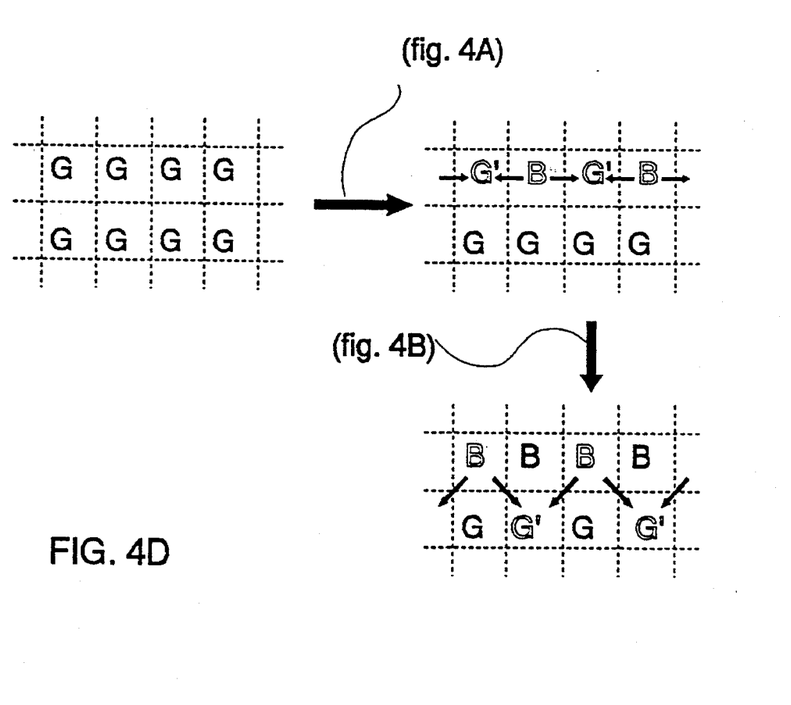

FIG. 4D illustrates how the grey values G are converted to binary values B by thresholding or to grey values G' by transportation of a quantization error. The outlined characters illustrate the values changed in these conditions.

Figure 5A:
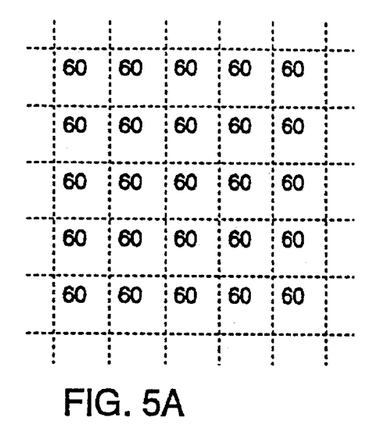
Figure 5B:
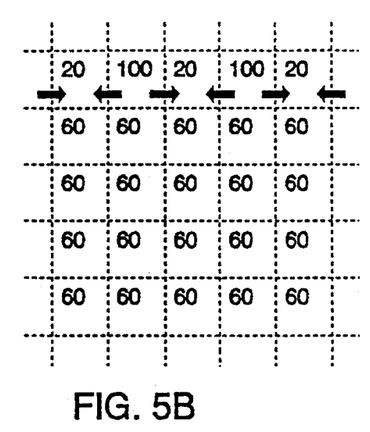
Figure 5C:
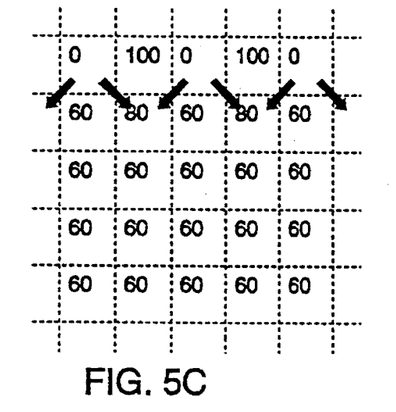
Figure 5D:
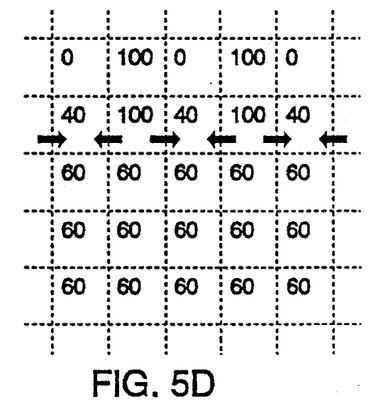
Figure 5E:
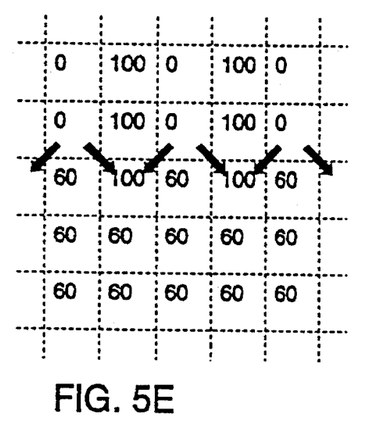
Figure 5F:
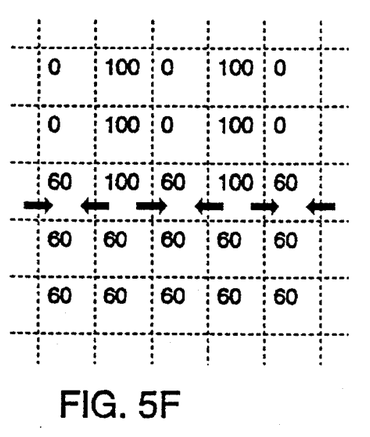
Figure 5G:
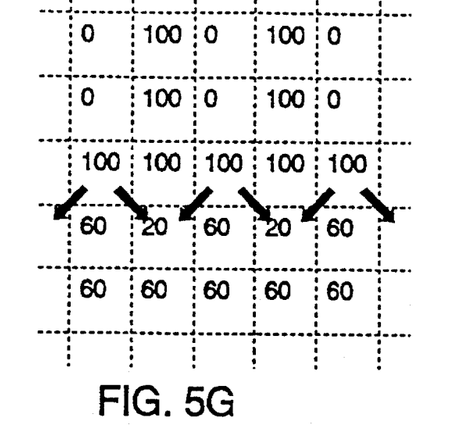
Figure 5H:
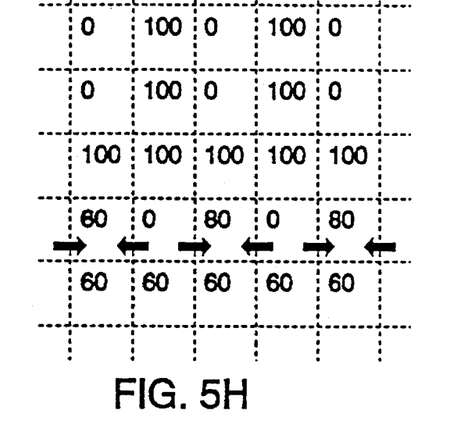
Figure 5I:
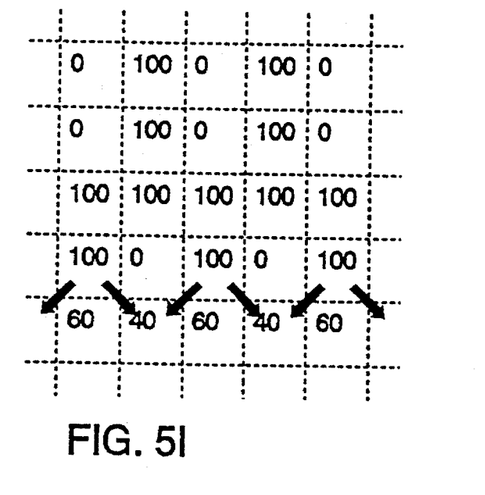
Figure 5J:
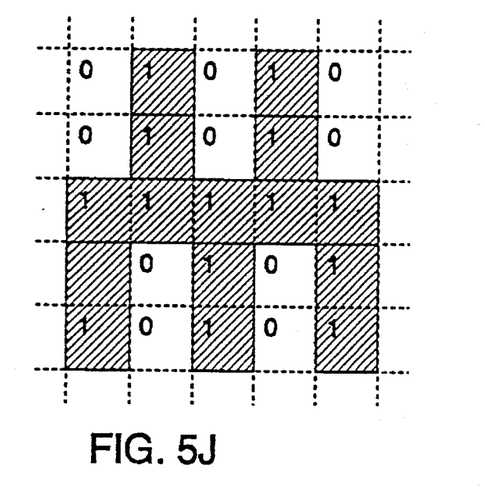

FIGS. 5A to 5J give an example of part of a grey value image before, during and after processing in accordance with the method described in FIGS. 4A to 4C. FIG. 5A represents a uniform grey value area with a grey value of 60 out of a possible range of grey values between 0 and 100. In the following FIGS. 5B to 5I the changes in the grey values are shown consecutively as they occur after processing in accordance with FIG. 4A or FIG. 4B. FIG. 5B shows the result after processing according to FIG. 4A (transportation of the quantization error to the left-hand and right-hand neighbor) in the case of thresholding of the odd pixels in the first row (group 2n−1) in FIG. 4C. FIG. 5C shows the result after processing according to FIG. 4B (transportation of the quantization error to the left-hand and right-hand neighbor in the following row) on the even pixels in the first row (group 2n) of FIG. 4D. The first row is now thresholded, the quantization errors being distributed to the second row. FIGS. 5D and 5E show the result after the same processing operations carried out on the second row, FIGS. 5F and 5G the result after processing carried out on the third row and finally FIGS. 5H and 5I show the result after processing carried out on the fourth row. FIG. 5J illustrates the finally obtained pattern of binary values. Of the 25 pixels in this example 15 are "ones", i.e. 60% of the total, corresponding to the grey value of 60.

Figure 6A:
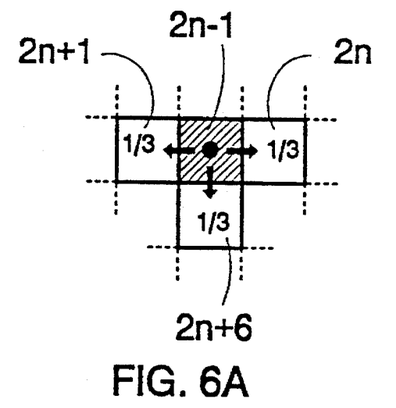
Figure 6B:
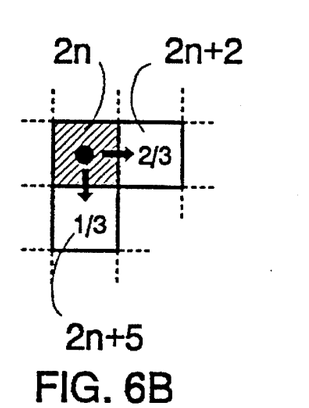
Figure 6C:
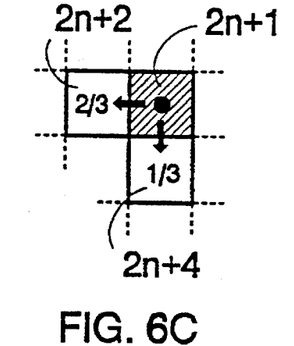
Figure 6D:
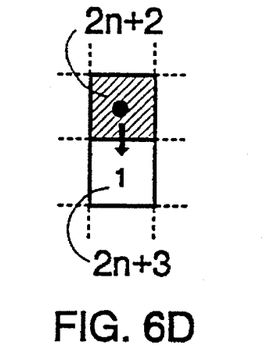
Figure 6E:
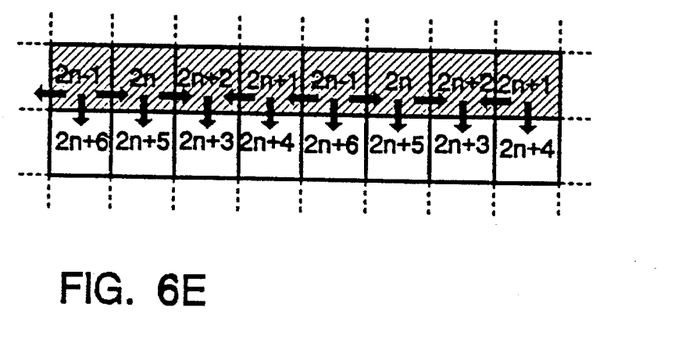

FIGS. 6A to 6E illustrate a third embodiment of a method according to the invention. Whereas in the embodiments according to FIGS. 3A and 3B, and FIGS. 4A to 4C, respectively, the pixels in a horizontal line are divided up into one and two characteristic groups respectively, in the embodiment shown in FIGS. 6A to 6E, the pixels of a horizontal line are divided into four characteristic groups. FIG. 6E shows the division of the pixels. The characteristic groups are formed in each horizontal row and are numbered as 2n−1, 2n, 2n+1 and 2n+2. FIGS. 6A, 6B, 6C and 6D respectively illustrate the conditions for transportation of the quantization error from the pixels of the groups 2n−1, 2n, 2n+1, 2n+2 shown in FIG. 6E. Also, compared with the embodiments described hereinbefore, in this embodiment the quantization error is transported over more than one other group, as will be apparent from the conditions shown in FIGS. 6A, 6B and 6C.

The sequence in which the groups of pixels are thresholded is as follows:

| 1st row | | | |
|---|---|---|---|
| from group 2n − 1 | according to FIG. 6A | to group 2n | and group 2n + 1 and group 2n + 6 |
| from group 2n | according to FIG. 6B | to group 2n + 2 | and group 2n + 5 |
| from group 2n + 1 | according to FIG. 6C | to group 2n + 2 | and group 2n + 4 |
| from group 2n + 2 | according to FIG. 6D | to group 2n + 3 | |
| 2nd row | | | |
| from group 2n + 3 | according to FIG. 6A | to group 2n + 4 | and group 2n + 5 and group 2n + 10 |
| from group 2n + 4 | according to FIG. 6B | to group 2n + 6 | and group 2n + 9 |
| from group 2n + 5 | according to FIG. 6C | to group 2n + 4 | and group 2n + 8 |
| from group 2n + 6 | according to FIG. 6D | to group 2n + 3 | |
| 3rd row etc. | | | |

Figure 6F:
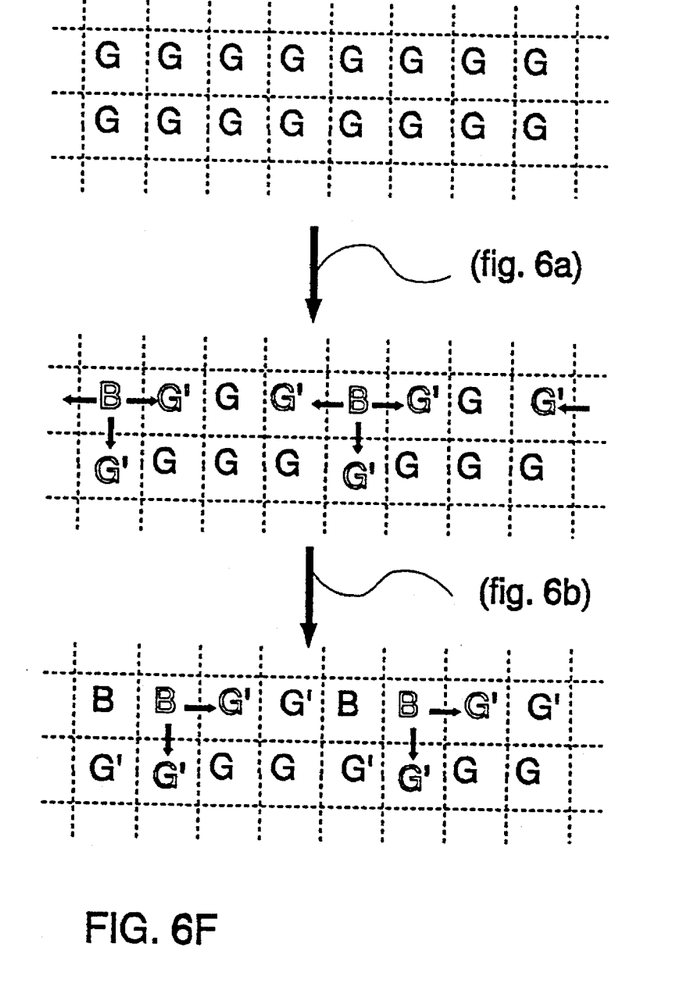
FIGS. 6F and 6G show an example of a digitized image processed by the method according to FIGS. 6A to 6E, and FIGS. 7A and 7B diagrammatically illustrate an image processing device according to the present invention.
Figure 6G:
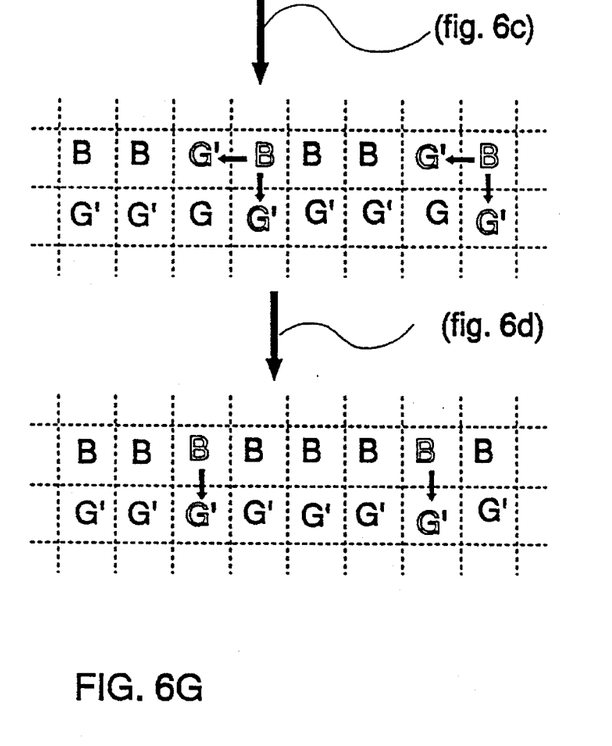

Finally, FIGS. 6F and 6G illustrate how the grey values G are converted to binary values B by thresholding or are corrected to grey values G' by transportation of a quantization error. The outlined characters indicate the instantaneously changed values.

Figure 7A:
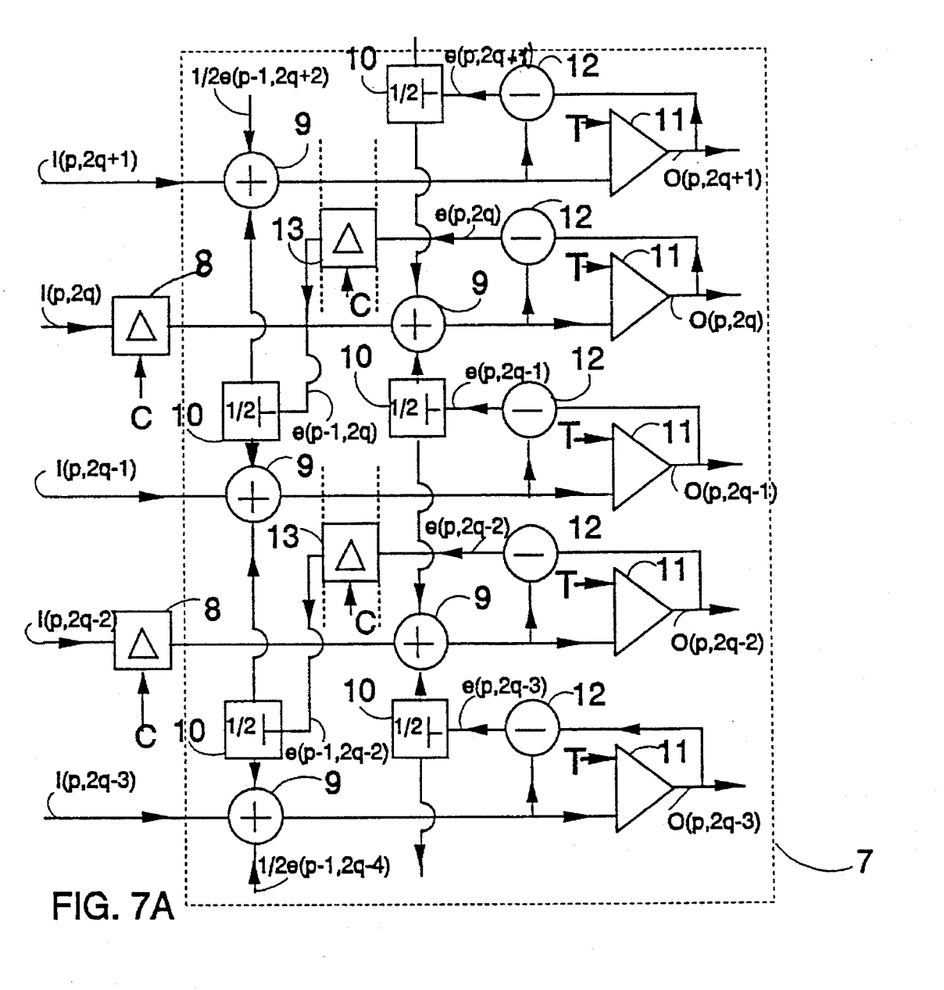

FIG. 7A illustrates a halftoning unit 7 suitable for performing the method indicated in FIGS. 4A to 4C. Grey value signals l(p,2q) and l(p,2q−2) of pixels, situated in even columns 2q and 2q−2, in a row p of a grey value image divided up into rows p and columns q are fed to input buffers 8. Under the control of control signals C also fed to the latter, the grey value signals l(p,2q) and l(p,2q−2) buffered therein are then fed to adding units 9 of the halftoning unit 7 at the time when the error signals e(p,2q+1), e(p,2q−1) and e(p,2q−3), corresponding to the pixels situated in the odd columns 2q+1, 2q−1 and 2q−3 of the same row p are available, these error signals being transported to the grey value signals via the adding units 9.

The grey value signals l(p,2q+1), l(p,2q−1) and l(p,2q−3) which are not fed to the input buffers 8 and which correspond to the pixels of row p situated in the odd columns 2q+1, 2q−1 and 2q−3 are, on the other hand, fed directly to the adding units 9 of halftoning unit 7. The error signals e(p−1,2q−4), e(p−1,2q−2), e(p−1,2q) and e(p−1,2q+2) which are to be transported to these signals and which correspond to the pixels of the previous processed row p−1 situated in the even columns 2q−4, 2q−2 and 2q are in fact already available. These have already been calculated in the previous processing step with respect to line p−1 and are stored in the error buffers 13. Each grey value signal l(p,...) corrected by the error signals in the manner described above is then fed to a corresponding thresholding unit 11. The thresholding units 11 compare these corrected grey value signals l(p,...) with a predetermined threshold value T. The thresholding units 11 generate output signals O(p,...) which can assume one of two possible logic values. One or other of the logic values is generated according to whether the grey value signals l(p,...) fed are larger or smaller than the threshold value T. Subtraction units 12, by reference to the output signals O(p,...) thus generated and fed to the units, and the corrected grey value signals l(p,...), determine the magnitudes of the quantization errors made by thresholding. The error signals e(p,...) representing the quantization error are then each divided in half via error division units 10 and fed to the above-mentioned adding units 9. Error signals e(p,2q) and e(p,2q−2) corresponding to the pixels situated in the even columns 2q and 2q−2 are first stored in the error buffers 13 in these conditions. The error signals e(p,2q) and e(p,2q−2) stored therein are read out and fed to the connected error division units 10 at a time when grey value signals l(p+1,...) of a following pixel row p+1 are fed to the halftoning unit 7. The error buffers 13 thus store the error signals for at most the processing time required for one row. It should be noted that the number of grey value signals l(p,...) to be processed in parallel is arbitrary and FIG. 7A simply shows the processing of a limited number of grey value signals l(p,...).

Figure 7B:
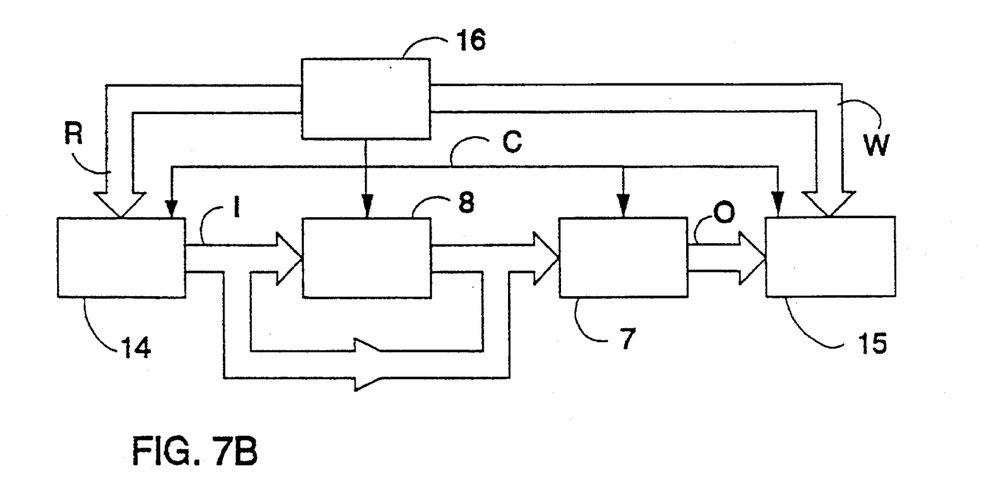

FIG. 7B diagrammatically shows how the halftoning unit 7 shown in FIG. 7A can be coupled to a grey value memory 14 and to a binary or bit map memory 15. A control unit 16 generates address reading signals R for the selection of grey value signals l(p,...) to be fed to the halftoning unit 7 and the input buffers 8. The control unit 16 also generates address write signals W for writing the binary output signals O(p,...) generated by the halftoning unit 7 into the bit map memory 15. Finally, the control unit 16 generates control signals C, e.g. synchronization signals.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of parallel intralinear halftoning of digitized grey value images divided into rows and columns thereby defining a pixel as an intersection of a row and column, comprising the steps of:

a) selecting either the rows or the columns as lines Upon which thresholding will be performed;

b) ordering the lines into a sequence c) successively thresholding, according to the sequence, grey values of pixels in the lines of an image; and d) transporting a quantization error, caused by said thresholding for each pixel, to at least one neighboring pixel yet to be thresholded, by adding said quantization error or part thereof to a grey value of said at least one neighboring pixel;

wherein the step c) includes:

c1) dividing each of said lines of said image into at least two disparate groups, each group having a plurality of pixels; and c2) separately thresholding each group within each line; and wherein the step d) transports at least a portion of said quantization error from a pixel of one group in the line to at least one pixel of at least one other disparate group;

wherein the step a) selects the rows to be the lines;

wherein the step c) further includes:

c3) establishing, for each row, a group of pixels situated in odd columns of said row and, for each row, a group of pixels situated in even columns of said row;

wherein the method transports said quantization error from a pixel in an odd column to pixels yet to be thresholded in two adjacent even columns of the same row; and wherein the method transports the quantization error from a pixel of a row situated in an even column to pixels yet to be thresholded in two adjacent odd columns of an adjacent row.

2. A method according to claim 1, wherein the transportation of said quantization error is accomplished using identical weighting factors.

3. An image processing device for parallel intralinear halftoning of digitized grey value images divided into rows and columns thereby defining a pixel as an intersection of a row and column, the device comprising:

input means for receiving the grey value images;

selection means for selecting either the rows or columns as lines upon which thresholding will be performed;

ordering means for ordering the lines into a sequence; and a halftoning unit connected to said input means, for halftoning the sequence of lines;

output means, responsive to said halftoning unit, for outputting binary signals;

wherein said halftoning unit includes:
thresholding means for thresholding the lines to produce thresholded values;

quantization error determining means for determining an error representative of a difference between a pixel value and the corresponding thresholded value, produced by said thresholding means; and error division means for transporting at least a part of said error to a pixel that has yet to be fed to said thresholding means and that corresponds to at least one neighboring pixel;

wherein said halftoning unit:
divides each of the lines in an image into at least two disparate groups, each group having a plurality of pixels; and separately thresholds each group within each line; and wherein said error division means transports at least a portion of an error signal from a pixel of one group in the line to a pixel of at least one other group yet to be thresholded;

wherein the selection means selects the rows to be the lines; and wherein said halftoning unit also establishes, for each row, a group of pixels situated in even columns of said row and establishes, for each row, a group of pixels situated in odd columns of said row;

wherein said error division means transports an error from a pixel of a row, situated in an odd column, to pixels yet to be thresholded in two adjacent pixels of the same row, situated in the even columns, and transports an error from a pixel of a row, situated in an even column, to pixels yet to be thresholded in an adjacent row situated in adjacent odd columns.

4. An image processing device according to claim 3, wherein:
said error division means transports said error signal using identical weighting factors on said pixels yet to be thresholded.

5. A system comprising:
a scanner;
a printer; and
an image processing device according to claim 3.

6. A method of parallel intralinear halftoning of a grey value image that has been divided into lines, the method comprising:

a) dividing the image into rows and columns such that: a pixel is defined as an intersection of a row and a column; and rows and columns each include a plurality of pixels;

b) selecting either the rows or the columns as the lines upon which thresholding will be performed;

c) ordering the lines into a sequence;

d) processing each line in turn according to the sequence;

wherein the step d) includes:
e) thresholding, for a present line, a plurality of pixels taken only from the present line; and f) transporting at least a portion of a quantization error for each of a selected number of thresholded pixels in the present line to at least one pixel in the next line in the sequence;

wherein the step c) includes:
c1) partitioning the line into at least a first and second disparate group of pixels;

wherein the step e) includes:
e1) thresholding the first group of pixels;
e2) transporting at least a portion of a quantization error of each of a selected number of the thresholded pixels in the first group to the second group; and
e3) thresholding the second group; and wherein the step f) includes:
f1) transporting at least a portion of a quantization error of each of a selected number of the thresholded pixels in the second group to the next line.

7. A method as in claim 6, wherein the rows are selected in step b) as the groups.

8. A method as in claim 6, wherein:
the step e1) simultaneously thresholds each pixel in the first group; and wherein the step e3) simultaneously thresholds each pixel in the second group.

9. A method as in claim 8, wherein:
the steps e1) and e3) use the same threshold.

10. A method as in claim 8, wherein, for each pixel, the step e2) includes:
e2A) comparing the pixel value against a threshold;
e2B) determining a difference between the pixel value and the threshold;
e2C) scaling the difference by a predetermined scaler to form an error fraction; and
e2D) adjusting at least one pixel value in the second group by the scaled difference of step e2C).

11. A method as in claim 10, wherein:
the step e2A) compares so as to detect if the value of the pixel is less than a threshold;
the step e2B) determines the difference by subtracting the pixel value from the threshold; and
the step e2D) adjusts by adding the error fraction to at least one pixel in the second group;
the steps e2B)–e2D) being performed when the pixel value is less than the threshold.

12. A method as in claim 11, wherein:
the predetermined scaler is the reciprocal of the number of pixels in the second group to which the error fraction will be added.

13. A method as in claim 10, wherein:
the step e2A) compares so as to detect, for each pixel, if the value of the pixel is greater than the first threshold;
the step e2B) determines the difference by subtracting the threshold from the pixel value; and the step e2D) adjusts by subtracting the error fraction from at least one pixel value in the second group;

the steps e2B)–e2D) being performed when the pixel value is greater than the threshold.

14. A method as in claim 6, wherein:

the first group corresponds to even pixels in the line; and wherein the second group corresponds to odd pixels in the line.

15. A method as in claim 6, wherein:

the steps e2) and f1) transport a quantization error portion for all the thresholded pixels.

16. A method as in claim 6, wherein the step f) transmits all of the quantization error to the next line.

17. A method of parallel intralinear halftoning of a grey value image that has been divided into lines, the method comprising:

a) dividing the image into rows and columns such that: a pixel is defined as an intersection of a row and a column; and rows and columns each include a plurality of pixels;

b) selecting either the rows or the columns as the lines upon which thresholding will be performed;

c) ordering the lines into a sequence;

d) processing each line in turn according to the sequence;

wherein the step d) includes:

e) thresholding, for a present line, a plurality of pixels taken only from the present line; and f) transporting at least a portion of a quantization error for each of a selected number of thresholded pixels in the present line to at least one pixel in the next line in the sequence;

wherein the step c) includes:

c1) partitioning the line into a first, second, and third disparate group of pixels;

wherein the step e) includes:

e1) thresholding the first group of pixels;

e2) transporting at least a portion of a quantization error of each thresholded pixel in the first group to the second group;

e3) thresholding the second group;

e4) transporting at least a portion of a quantization error of each thresholded pixel in the second group to the third group; and e5) thresholding the third group;

wherein the step f) includes:

f1) transporting at least a portion of the quantization error of each thresholded pixel in the third group to the next line.

18. A method as in claim 17, wherein:

the step c) includes:

c2) partitioning second group into a first and second disparate subgroup of pixels;

wherein the step e3) includes:

e3A) thresholding the first subgroup; and e3B) thresholding the second subgroup;

wherein the three groups are arranged along the line in a repeating pattern with each of the three groups represented in the pattern by a pixel as follows: a pixel of the first group; a pixel of first subgroup of the second group; a pixel of the third group; and a pixel of the second subgroup of the second group.

19. A method as in claim 17, wherein:

each of the steps e2) and e4) also transport a portion of the quantization error of each pixel to the next line.

20. A method as in claim 19, wherein:

the step e2) transports equal portions of the quantization error to the second group and the next line;

wherein the step e4) transports unequal portions of the quantization error to the third group and the next line; and wherein the step f1) transports all of the quantization error to the next line.

21. A method as in claim 17, wherein:

the steps e1), e3), and e5) each threshold all of the pixels simultaneously.

22. A method as in claim 17, wherein, for each pixel, the steps e2), e4), and f1) include:

e2A) comparing the pixel value against a threshold;

e2B) determining a difference between the pixel value and the threshold;

e2C) scaling the difference by a predetermined scaler to form an error fraction; and e2D) adjusting at least one pixel value in the next group by the scaled difference of step e2C).

23. A method as in claim 17, wherein:

the three groups are arranged along the line in a repeating pattern with each of the three groups represented in the pattern by a pixel as follows: a pixel of the first group; a pixel of the second group; a pixel of the third group; and a pixel of the second group.

24. A method as in claim 17, wherein the rows are selected in step b) as the groups.

25. A method as in claim 17, wherein the step f) transmits all of the quantization error to the next line.

26. An apparatus for parallel intralinear halftoning of a grey value image that has been divided into lines, the apparatus comprising:

dividing means for dividing the image into rows and columns such that: a pixel is defined as an intersection of a row and a column; and rows and columns each include a plurality of pixels;

selection means for selecting either the rows or the columns as the lines upon which thresholding will be performed;

ordering means for ordering the lines into a sequence;

processing means, responsive to the ordering means, for processing each line in turn according to the sequence;

wherein the processing means includes:

line thresholding means for thresholding, for a present line, a plurality of pixels taken only from the present line; and inter-line transporting means, responsive to the thresholding means, for transporting at least a portion of a quantization error for each of a selected number of thresholded pixels in the present line to at least one pixel in the next line in the sequence;

wherein the ordering means includes:

partitioning means for partitioning the line into at least a first and second disparate group of pixels;

wherein the line thresholding means includes:

first thresholding means for thresholding the first group of pixels;

first transporting means, responsive to the first thresholding means, for transporting at least a portion of a quantization error of each of a selected number of the thresholded pixels in the first group to the second group; and second thresholding means for thresholding the second group; and wherein the inter-line transporting means transports at least a portion of a quantization error of each of a selected number of the thresholded pixels in the second group to the next line.

27. An apparatus as in claim 26, wherein the selection means selects the rows as the groups.

28. An apparatus as in claim 26, wherein:

the first thresholding means simultaneously thresholds each pixel in the first group; and wherein the second thresholding means simultaneously thresholds each pixel in the second group.

29. An apparatus as in claim 28, wherein:

the first thresholding means and the second thresholding means use the same threshold.

30. Art apparatus as in claim 28, wherein, for each pixel, the first transporting means includes:

comparison means for comparing the pixel value against a threshold;

difference means for determining a difference between the pixel value and the threshold;

scaling means for scaling the difference by a predetermined scaler to form an error fraction; and adjusting means for adjusting at least one pixel value in the second group by the scaled difference of step e2C).

31. An apparatus as in claim 30, wherein:

the comparison means compares so as to detect if the value of the pixel is less than a threshold;

the difference means determines the difference by subtracting the pixel value from the threshold; and adjusting means adjusts by adding the error fraction to at least one pixel in the second group;

the difference means, the scaling means, and the adjusting means operate when the pixel value is less than the threshold.

32. An apparatus as in claim 31, wherein:

the predetermined scaler is the reciprocal of the number of pixels in the second group to which the error fraction will be added.

33. An apparatus as in claim 30, wherein:

the comparison means compares so as to detect, for each pixel, if the value of the pixel is greater than the first threshold;

the difference means determines the difference by subtracting the threshold from the pixel value; and the adjusting means adjusts by subtracting the error fraction from at least one pixel value in the second group;

the difference means, the scaling means, and the adjusting means operate when the pixel value is greater than the threshold.

34. An apparatus as in claim 26, wherein:

the first group corresponds to even pixels in the line; and wherein the second group corresponds to odd pixels in the line.

35. An apparatus as in claim 26, wherein:

the first transporting means and the inter-line transporting means transport a quantization error portion for all the thresholded pixels.

36. An apparatus as in claim 26, wherein the inter-line transporting means transmits all of the quantization error to the next line.

37. An apparatus for parallel intralinear halftoning of a grey value image that has been divided into lines, the apparatus comprising:

dividing means for dividing the image into rows and columns such that: a pixel is defined as an intersection of a row and a column; and rows and columns each include a plurality of pixels;

selection means for selecting either the rows or the columns as the lines upon which thresholding will be performed;

ordering means for ordering the lines into a sequence;

processing means, responsive to the ordering means, for processing each line in turn according to the sequence;

wherein the processing means includes:
line thresholding means for thresholding, for a present line, a plurality of pixels taken only from the present line; and
inter-line transporting means, responsive to the thresholding means, for transporting at least a portion of a quantization error for each of a selected number of thresholded pixels in the present line to at least one pixel in the next line in the sequence;

wherein the ordering means partitions the line into a first, second, and third disparate group of pixels;

wherein the line thresholding means includes:
first means for thresholding the first group of pixels;
first transporting means, responsive to the first thresholding means, for transporting at least a portion of a quantization error of each thresholded pixel in the first group to the second group;
second thresholding means, responsive to the first transporting means, for thresholding the second group;
second transporting means, responsive to the second thresholding means, for transporting at least a portion of a quantization error of each thresholded pixel in the second group to the third group; and
third thresholding means, responsive to the second transporting means, for thresholding the third group;

wherein the inter-line transporting means transports at least a portion of the quantization error of each thresholded pixel in the third group to the next line.

38. An apparatus as in claim 37, wherein:

the order means further partitions the second group into a first and second disparate subgroup of pixels;

wherein the second thresholding means includes:
first subgroup thresholding means for thresholding the first subgroup; and
second subgroup thresholding means for thresholding the second subgroup;

wherein the three groups are arranged along the line in a repeating pattern with each of the three groups represented in the pattern by a pixel as follows: a pixel of the first group; a pixel of first subgroup of the second group; a pixel of the third group; and a pixel of the second subgroup of the second group.

39. An apparatus as in claim 37, wherein:

each of the first transporting means and the second transporting means also transport a portion of the quantization error of each pixel to the next line.

40. An apparatus as in claim 39, wherein:

the first transporting means transports equal portions of the quantization error to the second group and the next line;

wherein the second transporting means transports unequal portions of the quantization error to the third group and the next line; and wherein the inter-line transporting means transports all of the quantization error to the next line.

41. An apparatus as in claim 37, wherein:

the steps first thresholding means, the second thresholding means, and the third thresholding means each threshold all of the pixels simultaneously.

42. An apparatus as in claim 37, wherein, for each pixel, the steps first transporting means, the second transporting means, and the inter-line transporting means each include:

comparison means for comparing the pixel value against a threshold;

difference means for determining a difference between the pixel value and the threshold;

scaling means for scaling the difference by a predetermined scaler to form an error fraction; and adjusting means for adjusting at least one pixel value in the next group by the scaled difference of step e2C).

43. An apparatus as in claim 37, wherein:

the three groups are arranged along the line in a repeating pattern with each of the three groups represented in the pattern by a pixel as follows: a pixel of the first group; a pixel of the second group; a pixel of the third group; and a pixel of the second group.

44. An apparatus as in claim 37, wherein the selection means selects the rows as the groups.

45. An apparatus as in claim 37, wherein the inter-line transporting means transmits all of the quantization error to the next line.

* * * * *